April 25, 1967 A. W. TOLLKUHN 3,315,840

AUTOMATIC DISK STACKING DEVICE

Filed Dec. 23, 1963 3 Sheets-Sheet 1

INVENTOR.
ARTHUR W. TOLLKUHN

BY

Fraser & Bogucki

ATTORNEYS

INVENTOR.
ARTHUR W. TOLLKUHN
BY
Fraser & Bogucki
ATTORNEYS

INVENTOR.
ARTHUR W. TOLLKUHN
BY
Fraser & Bogucki
ATTORNEYS

United States Patent Office 3,315,840
Patented Apr. 25, 1967

3,315,840

AUTOMATIC DISK STACKING DEVICE

Arthur W. Tollkuhn, San Jose, Calif., assignor to International Business Machines Corporation, New York, N.Y., a corporation of New York Filed Dec. 23, 1963, Ser. No. 332,608
3 Claims. (Cl. 221—75)

This invention relates to devices for use with a large number of precision disk elements, and more particularly relates to devices for handling, storing and transporting data recording disks for random access memory systems during and after fabrication of the disks.

Random access memories for modern data processing systems are characterized by having recording media which contain data in relatively high density and arranged so that an associated mechanism can gain access to any selected part of the data within a relatively short time, usually within a small fraction of a second. The most widely used form of random access memory employs a plurality of precision engineered disks having recording surfaces on one or both sides, the disks being rotatable at high speed on a common central shaft. Access to any selected data track on any particular disk may be had by an access mechanism which includes arms having terminal magnetic transducers which are movable into proximity to the selected data track on the disk. Such multidisk memory systems provides capacities of hundreds of millions of binary digits and access times of the order of 0.1 second to any particular data on any of the disks.

As is known to those skilled in the data processing art, loss of data or the introduction of errors in process data is considered to be intolerable. Therefore, the recording surfaces of data recording disks, such as those for high speed random access memories, must not only be initially free from irregularities which would result in loss of data or production of errors, but must remain so through repeated handlings. Several steps are usually required from the time the smooth polished substrates for the disks are fabricated to the time the data is recorded on the disks (for example, several magnetic coating and fininshing steps, in addition to transportation, handling and storage during and between these steps). Problems arise because of such handling, storing and transporting of the disks and disk substrates and such problems are critical inasmuch as the data is to be packed at such high density on the surfaces of the disks that a scratch or mark on such surface may introduce a high number of errors in the data. Even though such errors might in large measure be detected, correction thereof and refinishing of the disk are troublesome and expensive. Moreover, the disks are usually provided with a relatively wide central aperture but, apart from this, as much of the surface of the disk as possible is used for recording, in order to increase the capacity of the memory. Therefore, it is not feasible to provide gripping surfaces at the inner or outer edges of the disks for handling purposes during processing of the disks. It is desirable to transport the disks in such fashion that they are compactly but safely stored, while they may also be readily removed for use or further processing. Standard shipping containers are not only extremely bulky for the number of disks they can safety transport, but particularly difficult to use in conjunction with automatic transfer and handling equipment.

It is therefore an object of the present invention to provide improved means for handling, transporting and storing random access memory disks during and after fabrication thereof.

Another object of the present invention is to provide improved means for handling, storage and transportation of a plurality of random access memory disks in the unfinished or finished condition, which means minimizes the danger of scratching or marring of the disks and while conserving space.

These and other objects of the invention are achieved by providing means which employs a plurality of synchronized lead screws disposed about the periphery of disks which are supported on the screws. This lead screw arrangement is such that the disks are maintained level in stacked relation and separate from one another, even though they are very closely spaced. Accordingly, an improved disk stacker is provided. Moreover, the disks can be fed in either direction along the stacker to or from an access point. The control mechanism for the lead screws, if desired, can be mounted within the central apertures of the stack of disks, so as to be extremely compact. Moreover, the disk stacker can be made mobile, and can be provided with readily accessible components.

A specific example of a disk stacker, in accordance with the invention, includes three vertically aligned lead screws mounted symmetrically within the central portion of the disk stacker. All three lead screws are driven in the same direction at the same rate by a reversible motor through a gear chain. The threads of the lead screws are so configured that the inner edges of the discs rest on the upper surfaces of like portions of threads of the three screws, so that the disks are supported in horizontal planes. The lead distance between successive revolutions of the threads of the lead screws is only a few times greater than the thickness of the disks themselves, and the disk-bearing surfaces of the lead screws are of a suitable friction-minimizing material, such as plastic, so that no abrasive action is exerted on the disks while they repose in the stacker. At the access end of the stacking device, the first turn of each lead screw is provided with a greater pitch for easier handling of the associated disk. A pressure operated switch may also be utilized at such access end in order to stop the turning of the lead screws once a disk has arrived at the access end. This prevents two or more disks from coming into contact with each other at such end.

The foregoing and other objects, features and advantages of the invention will be apparent from the following more particular description of a preferred embodiment of the invention, as illustrated in the accompanying drawings.

Figure 1:
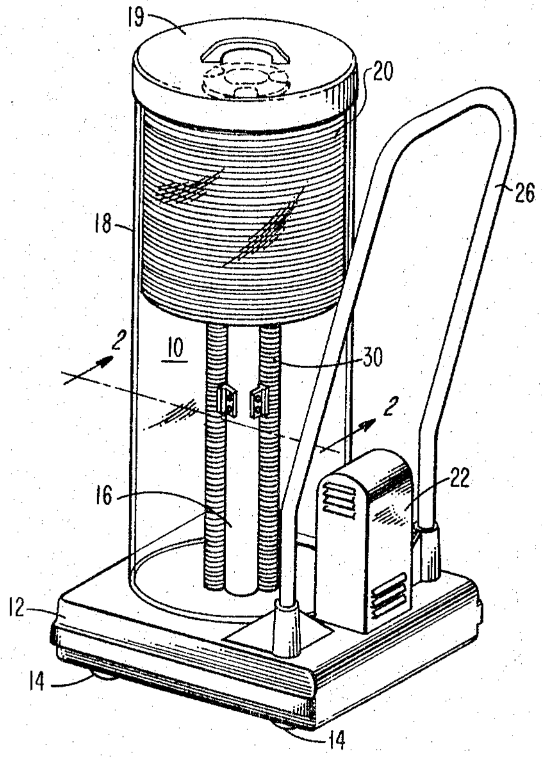
FIG. 1 is a perspective view of one embodiment of a disk stacking device in accordance with the invention.

Referring now to FIG. 1 of the accompanying drawings, a device 10 is shown which is particularly adapted for stacking, storing and transporting a plurality of magnetic disks for a random access memory during and after manufacture of the disks. The device 10 is also suitable for the handling, storage and transportation of other items in a manner which substantially completely removes danger of scratching and marring of the items. The device 10 includes a base member 12 supported on wheels 14. The base member, in turn, supports on the upper surface thereof a vertically extending disk-supporting column 16, a removable cylindrical disk housing 18 having a removable top cover 19 and enclosing disks 20 supported in stacked relation on the column 16, a motor housing 22 containing an electric reversible motor 24 and brake (see FIG. 7), and a handle 26 adapted to permit easy wheeling of the device 10 to various areas for use with a data processing system. Electrical control means 28 are interconnected with the motor 24 for regulating the operation of the device 10.

The magnetic disks 20 which are stored in the stacking device may be of any suitable type, for example, of the type used in the "Ramac" system sold by the International Business Machines Corporation, New York, N.Y. Such disks may have an outer radius of, for example, from fifteen to twenty-five inches, and a relatively large central aperture having an inner radius of, for example, from six to eleven inches. The disks 20 are typically of the order of .05 inch in thickness and as much of the recording surfaces as possible is utilized from the inner diameter to the outer diameter. The cross-sectional dimension of the disks 20 remains substantially constant and no flanges, hubs or other handling elements are employed on the disks themselves. Polished substrates representing the disks in uncoated, unfinished form can be stacked on the device 10 and shipped from the fabricator to the finisher, then wheeled from area to area during a magnetic coating process while being magnetically coated and finished. The device 10 forms a convenient means for storing and transporting the substrates and permits their removal and return to the device 10 without danger of scratching of their polished surfaces.

Figure 2:
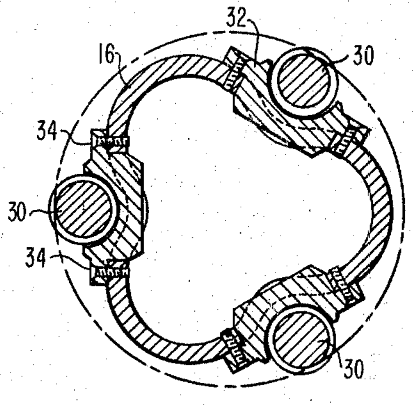
FIG. 2 is a section taken along the section line 2—2 of FIG. 1, illustrating the disk supporting portion of the device of FIG. 1.

The disks 20 are supported in spaced relation from one another on the arcuately shaped column 16 (FIG. 2) by means of three lead screws 30 disposed 120° apart, at equal radii about the central axis of the column 16. The screws 30 are secured to the column 16, as by the blocks 32 and threaded bolts 34 or the like. The upper end of the column 16 terminates in a hub 36 (FIG. 3) which is slightly smaller in diameter than the inner diameter of the disks 20 to be mounted on column 16. The hub 36 may be releasably secured to the upper end of the column, as by bolt and brackets or the like, generally designated by the numeral 37. Such hub 36 may have a beveled upper edge 38 for easy reception of the magnetic disks, and three symmetrically disposed bearings 40 on the under side thereof, into which the upper ends of the three lead screws 30 are journaled. The opposite ends of the screws 30 are set into corresponding bearings 42 in the base member 12. The bearings 40 and 42 may be ball bearings or the like.

The radial spacing of the lead screws 30 is such that the base of threads 44 of the screws 30 lies in a circle which is only slightly smaller in diameter than that defining a central aperture 46 in each of the disks 20. Thus, each disk 20 which is set on the lead screws 30, rides in a groove 48 between adjacent turns of the thread 44 of each of the three lead screws 30, being supported on the upper surface of a given portion of each thread 44 and in sliding engagement therewith. The lead screws 30 are preferably of plastic or plastic coated metal so as to provide a friction-minimizing surface to avoid deterioration of the disks 20 when in contact therewith. For such purposes, a plastic such as polytetrafluoroethylene has been found to have superior friction-resistant properties.

Figure 3:
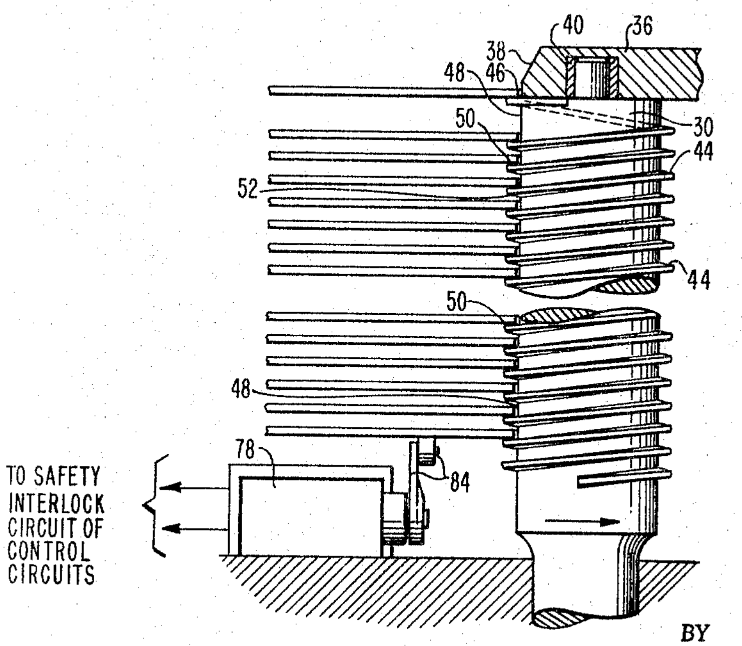
FIG. 3 is an enlarged fragmentary view, partially in cross section illustrating details of a support screw.

It will be noted that the thread 44 of each lead screw 30 is preferably specially configured, such as is shown in FIG. 3, in order to provide improved control of the disks 20. Thus, the threads 44 are preferably thin, relative to the intermediate grooves 48, each of such grooves preferably being somewhat larger than the thickness of a magnetic disk 20, and the lead distance between adjacent turns of each thread 44 being of the order of several times greater than the thickness of the disk 20. The shape of each thread 44 is preferably such that the upper surface 50 of each turn thereof, at least adjacent the periphery thereof, is substantially normal to the axis of the screw 30 so as to provide a flat, horizontal support for a disk 20. The underside 52 of each thread may be beveled or the like. The uppermost turn of each thread 44, as shown in FIG. 3, preferably has a higher pitch than the remaining turns so that a relatively larger spacing exists between the uppermost magnetic disk 20 engaging the uppermost turn and the disk 20 immediately underneath in a stack of disks 20 on device 10. For .05 inch thickness disks, it is preferred to employ lead screws having a pitch of six threads per inch, the thread turns being about .166 apart. The uppermost turn of the lead screw, however, preferably has a spacing of about .375 inch to facilitate handling of disks at the upper end of the column 16.

Figures 4, 5, 6:
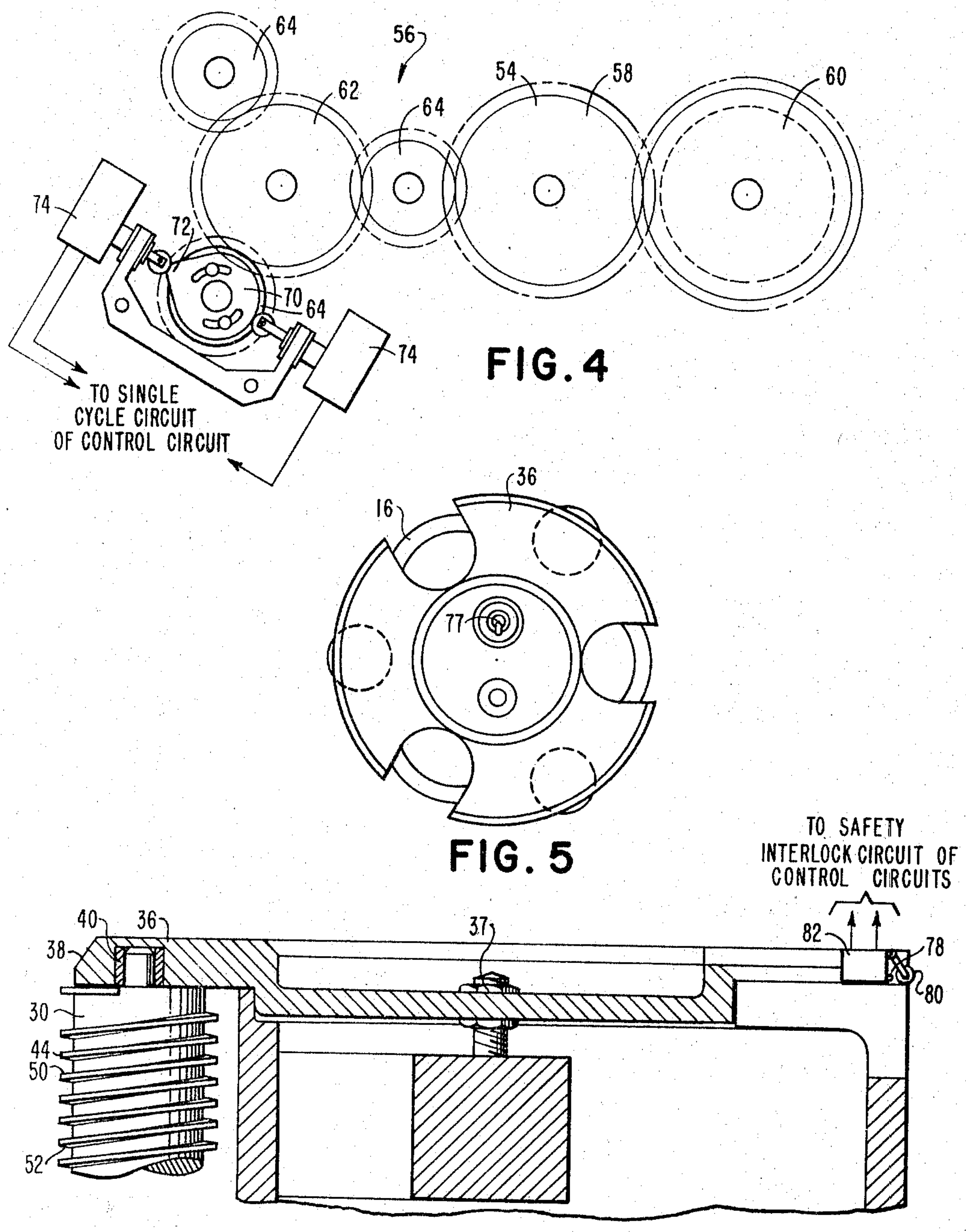
FIG. 4 is a schematic bottom plan view of a typical gear train employed in the device of FIG. 1.
FIG. 5 is a plan view of the disk supporting portion of the device of FIG. 1.
FIG. 6 is an enlarged fragmentary cross-section illustrating the upper end of the disk supporting portion of the device of FIG. 1.
Figures 7, 8:
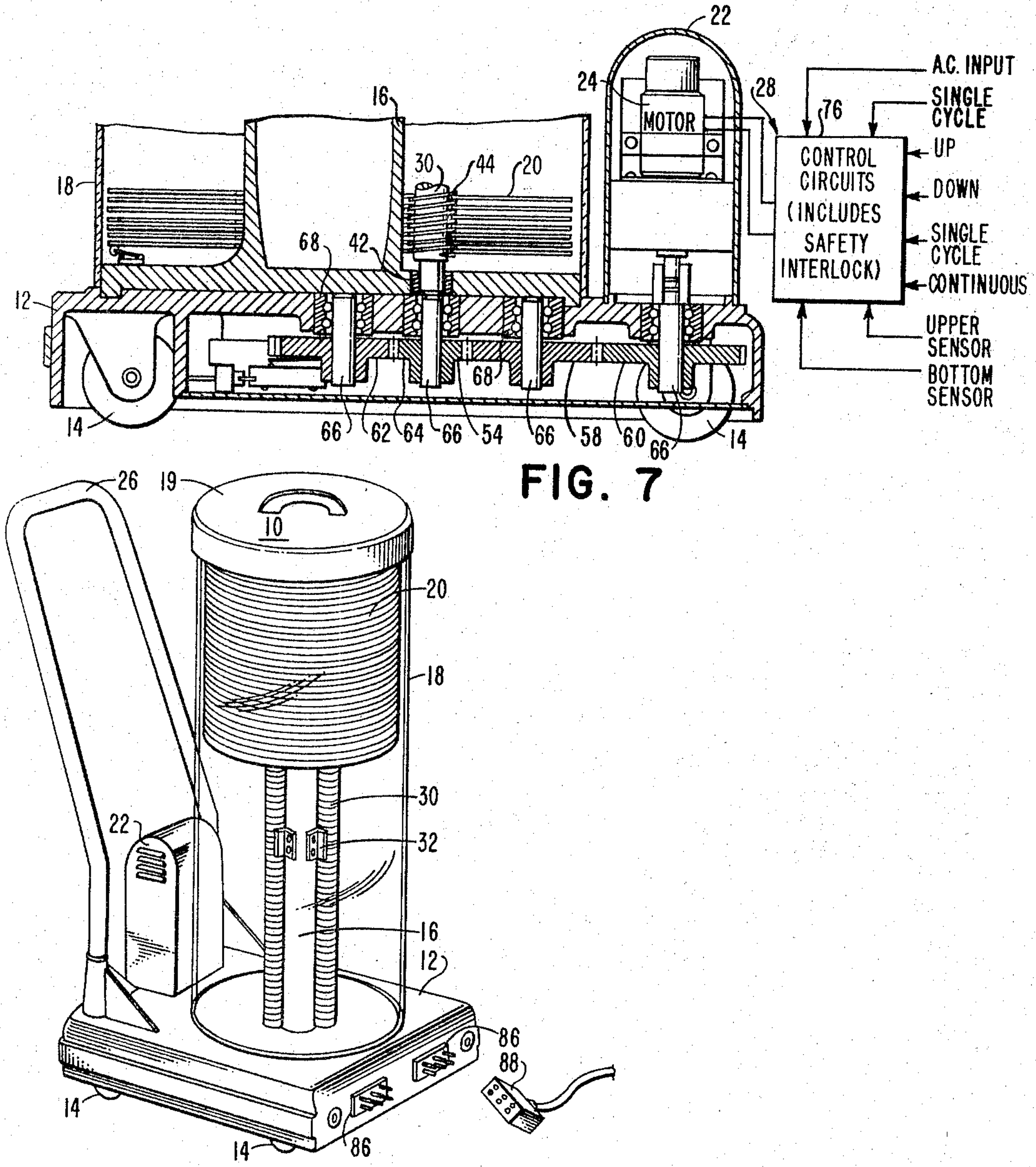
FIG. 7 is an enlarged fragmentary cross-section of the lower portion of the device of FIG. 1.
FIG. 8 is a perspective view of a portion of the device of FIG. 1 illustrating electrical power connecting means for the device.

The three leads screws 30 are driven in synchronism with each other, that is, at the same rate and in the same direction by a driven mechanism 54, shown in FIG. 7, which includes a gear train 56 (FIG. 4) coupled to the motor 24. The gear train is connected to the underside of the base 12 and includes, as shown in FIGS. 7 and 4, in idler 58 coupled to a motor drive gear 60, a sun gear 62 disposed concentric with the longitudinal axis (vertical) of the column 16, and three concentrically positioned spur or planetary gears 64 disposed symmetrically around the sun gear, at 120° angles from one another. The shafts 66 (FIG. 7) of the respective gears are journaled in suitable bearings 68. Each gear 64 is the base of a separate lead screw 30, and one of the gears 64 also couples to both the idler 58 and the sun gear 62 so that the rotation of all of the lead screws 30 is synchronized.

The control means 28 for the device 10 includes a plurality of separate sensing arrangements for controlling the motor, not all of which need be utilized in a given configuration in accordance with the invention. Preferably, however, the control means 28 includes a single cycle control in the form of a cam member 70 having a single cam lobe 72 rotatable with one of the planetary gears 64. The cam lobe 72 contacts and operates each of two switches 74, disposed at 180° from one another around the gear 64, in the course of one revolution. Each cam operated switch 74 is electrically coupled to a control circuit in a central control box 76 which may be mounted in the motor housing 22, whereby current flow to the motor 24 is controlled. Such control box 76 includes conventional relay circuits (FIG. 7) which are arranged to respond to an automatically provided start pulse or a manually provided start pulse (as per switch 77 mounted on the hub 36) and which maintain the motor energized until a stop pulse is received thereafter from one of the cam operated switches 74. Every one-half revolution of the cam-connected gear 64 results in the generation of an impulse, so that the turning of the screws 30 is stopped at controlled points. If the magnetic discs 20 are to be supplied from the stacking device 10 to an automatic transfer system on a continuous basis, this stop cycle mechanism can be bypassed or otherwise disengaged, as per circuitry in the box 76.

The control means 28 may also include a pair of disk position sensing switches 78 which are utilized for safety purposes, one at the upper or access end of the stacking device 10 and one adjacent the lower end of the screws 30. Thus, the switches 78 are used to control operation of the motor 24 and screws 30 with respect to the desired upper and lower limits of the stack of disks 20 on the column 16. At the upper access position, in an opening in the upper hub 36 of the central column 16, a roller actuator member 80 extends outwardly to engage the inner diameter of the magnetic disk 20 disposed in the uppermost position on the column 16. When a disk 20 is present in that position, the roller member 80 engages a switch contact 82, closing a circuit which is coupled to elements in the control box 76 and which prevents the motor 24 from effecting further rotation of the screws 30 in the direction in which the disks 20 are fed upwardly in and outwardly from the device 10.

At a selected bottom limit position for the disks 20 near the base 12, the second safety switch 78 is disposed. This second switch, as shown in FIG. 3, has a cushioned arm 84 positioned in the path of the downwardly moving magnetic disks 20. When the lowermost disk 20 reaches this lower limit position, it closes the switch 78, which is coupled with control elements in the control box 76 so as to disable the motor 24 from further rotation of the screws 30 in the direction in which the disks 20 are moved downwardly.

As shown in FIG. 8, male plugs 86 may be provided in the base 12 which plugs are electrically connected to the control box 76. Mating female plugs, such as 88 can be used to interconnect the box 76 with a source of electrical power (not shown) through the plugs 86.

The described device provides automatic separation and firm retention of the various disks 20, even though a great many of such disks (several hundred in a typical case) may be stacked in the described manner about the column 16 within the disk housing 18 and so that such disks can be conveniently stored and transported and can be removed from and returned to the device 10 with maximum protection of their surfaces. In the loading of the device 10, each disk 20 is, in turn, placed first on the uppermost turn of the threads 44 of the lead screws 30, adjacent the upper hub 36 of the central column 16. Then the switch 77 can be actuated to energize the motor 24 for rotation of the screws 30 to effect movement of the disk 20 in a downward direction. The motor 24 turns the lead screws 30 to effect movement of the disk 20 in a downward direction. The motor 24 turns the lead screws 30 to a controlled position of the associated gear 64 i.e. until the previously described stop mechanism connected to a gear 64 provides a stop signal. Alternatively, of course, a start signal for such operation could be initiated by the upper sensing switch 78 at the disk access position.

The magnetic disk 20 which is positioned at the uppermost position is thus moved down the column 16 a substantial distance, because of the increased pitch on the first turn of the thread 44 of each screw 30. Thereafter, as each successive disk 20 is placed on the top of the central column 16 at the access point, all disks previously loaded are moved down toward the base member. This sequence can continue until a desired number of disks are loaded, or until the stacking device is completely full, as indicated by the disabling signal and an appropriate indicator, if desired, under control of the bottom sensing switch 78.

To unload the stacking device, the desired sequence is merely reversed, in that the switch 77 can be moved to a position which effects rotation of the motor in a direction to cause upward movement of the disks 20. The switch 77 is connected through the control box 76 with the motor 24. The upper shut-off switch 78 causes, in any event, each cycle of upward movement of the disks 20 to terminate when a disk 20 has reached the upper access end of the stack of disks, so that such disk 20 is ready for automatic or manual transfer from the device 10 to associated equipment of a random access memory system.

With the device 10, each of the disks 20 is securely held, not only when stationary, but throughout the entire loading and unloading operation. It should be noted that during use of the device 10 there is a minimum contact between the components of the device 10 and the disks 20 but that in any event the abrasive effects of such contact are kept to a minimum by maintaining only surfaces having low frictional resistance for contacting the disks. Moreover, no spacers or specially configured containers need be utilized for the disks, so that space is saved.

It will be understood that various modifications can be made in the device 10. Thus, the drive mechanism for the device can be entirely contained within the central column 16, if desired. Moreover, for centain types of storage disks it may be preferred to dispose the lead screws about the outer diameter of the disks or to utilize a form of incremental-advancing mechanism different from that described above. It will be understood that any suitable number of lead screws can be used in any suitable configuration to provide adequate controlled single plane support of disks or other suitably shaped units which are to be securely stacked.

While the invention has been particularly shown and described with reference to a preferred embodiment thereof, it will be understood by those skilled in the art that various changes in form and details may be made therein without departing from the spirit and scope of the invention.

What is claimed is:

1. An automatic magnetic disk stacking device for random access memory disks which have a central aperture defining a substantial inner diameter and which are generally circular in outline, said device comprising, in combination, a wheeled base member, a reversible drive motor mounted on the base member, a plurality of vertically extending spaced lead screws mounted in and projecting upwardly from the base member, the screws being symmetrically disposed at like radii about a common axis so that all the lead screws are capable of simultaneously engaging the inner diameter of a magnetic disk in a sliding low friction fit, the lead distance between adjacent turns of the threads of the lead screws corresponding to a desired increment of spacing between disks and being greater than the thickness of the disks and the lead screw threads being thin in width relative to the width of the grooves intermediate adjacent turns of each thread, hub means rotatably coupled to the upper ends of said lead screws and smaller in cross-sectional area than the inner diameter of said disks, and means mounted in the base member and interconnecting each of the lead screws to the drive motor for driving the lead screws in synchronism.

2. An automatic magnetic disk stacking device for random access memory disks which have a central aperture defining a predetermined inner diameter and which are generally circular in outline, the device comprising, in combination, a wheeled base member, a central column vertically mounted on the base member and smaller in cross-sectional dimension than the central apertures of the disks, three substantially identical vertically extending lead screws disposed symmetrically about and secured to the central column, the lead screws each being rotatably mounted in the base member, the lead between adjacent turns of the threads of the screws through the major portion of the length of the screws being substantially greater than the thickness of the disks, the lead of the uppermost turn being even greater, and the lead screw threads being thin in width relative to the width of the grooves intermediate adjacent turns of each thread, the lead screws being radially positioned relative to the central axis such that the grooves in the three screws lie in sliding engagement with the inner periphery of an encompassing magnetic disk, at least the upper disk-supporting surfaces of the threads of the lead screws being horizontal and having low frictional resistance, a hub member smaller in cross-sectional dimension than the central apertures of the disks and rotatably receiving the upper ends of the lead screws, a housing having a removable top cover, the housing being disposed around the disks and column and releasably secured to the upper surface of the base member, a reversible drive electric motor mounted on the base member, and drive means mounted on the underside of the base member and interconnecting the motor and the lead screws for simultaneously driving all of the lead screws in the same direction at the same rate of rotation.

3. An automatic magnetic disk stacking device for random access memory disks which have a central aperture defining a predetermined inner diameter and which are generally circular in outline, the device comprising, in combination, a wheeled base member, a central column vertically mounted on the base member and smaller in cross-sectional dimension than the central apertures of the disks, a hub member mounted on the upper end of the central column and concentric with the central axis thereof, the hub member having a beveled upper edge and an outer diameter engaging the inner diameter of a magnetic disk with a sliding fit, three substantially identical vertically extending lead screws disposed symmetrically about and secured to the central column, the lead screws each being rotatably mounted in the base member on one end and the hub member on the opposite end, the lead between adjacent turns of the threads of the screws through the major portion of the length of the screws being substantially greater than the thickness of the disks, the lead of the uppermost turn being even greater, and the lead screw threads being thin relative to the width of the grooves intermediate adjacent turns of each thread, the lead screws being radially positioned relative to the central axis such that the grooves in the three screws lie in sliding engagement with the inner periphery of an encompassing magnetic disk, at least the upper disk-supporting surfaces of the threads of the lead screws being horizontal and being formed of a low frictional resistance material, a housing having a removable top cover, the housing being disposed around the disks and column and releasably secured to the upper surface of the base member, a reversible electric motor mounted on the base member at a point spaced from the central column, and drive means mounted on the underside of the base member and interconnecting the motor and the lead screws for simultaneously driving all of the lead screws in the same direction at the same rate of rotation.

References Cited by the Examiner

UNITED STATES PATENTS

| | | | |
|---|---|---|---|
| 1,806,707 | 5/1931 | Raymond | 221—222 |
| 1,985,697 | 12/1934 | Stecher | 221—75 X |
| 2,520,481 | 8/1950 | Tuerff | 221—75 X |
| 2,609,779 | 9/1952 | Goldsworthy | 221—222 X |
| 2,633,958 | 4/1953 | Childers | 221—75 X |
| 2,795,702 | 6/1957 | Morris. | |
| 2,922,548 | 1/1960 | Anderson | 221—185 X |
| 3,082,908 | 3/1963 | Ingham | 221—185 X |
| 3,162,494 | 12/1964 | Tassie | 312—35 |

UNITED STATES PATENTS

| | | |
|---|---|---|
| 2,148 | 1914 | Great Britain. |

References Cited by the Applicant

UNITED STATES PATENTS

| | | |
|---|---|---|
| 2,244,611 | 6/1941 | Couden. |
| 2,312,960 | 3/1943 | Couden. |
| 2,589,899 | 3/1952 | Vail. |
| 2,670,261 | 2/1954 | Mueller. |
| 2,922,527 | 1/1960 | Finn. |

ROBERT B. REEVES, *Primary Examiner.*

KENNETH N. LEIMER, *Examiner.*